US011173559B2

(12) United States Patent
Stadtfeld et al.

(10) Patent No.: US 11,173,559 B2
(45) Date of Patent: Nov. 16, 2021

(54) BEVEL GEAR CUTTER AND BLADE CONSOLIDATION (71) Applicant: THE GLEASON WORKS, Rochester, NY (US)

(72) Inventors: Hermann J. Stadtfeld, Webster, NY (US); Anthony J. Norselli, Hilton, NY (US); Markus J. Bolze, Pittsford, NY (US)

(73) Assignee: THE GLEASON WORKS, Rochester, NY (US)

( * ) Notice: Subject to any disclaimer, the term of this patent is extended or adjusted under 35 U.S.C. 154(b) by 85 days.

(21) Appl. No.: 16/614,469

(22) PCT Filed: Jul. 13, 2018

(86) PCT No.: PCT/US2018/041916
§ 371 (c)(1),
(2) Date: Nov. 18, 2019

(87) PCT Pub. No.: WO2019/014509
PCT Pub. Date: Jan. 17, 2019

(65) Prior Publication Data
US 2020/0198036 A1 Jun. 25, 2020

Related U.S. Application Data (60) Provisional application No. 62/531,917, filed on Jul. 13, 2017.

(51) Int. Cl.
B23F 21/22 (2006.01)
B23F 1/06 (2006.01)
(Continued)

(52) U.S. Cl.
CPC .............. B23F 21/223 (2013.01); B23F 1/06 (2013.01); B23F 9/105 (2013.01); B23F 17/00 (2013.01)

(58) Field of Classification Search
CPC ........ B23F 17/00; B23F 9/105; B23F 21/223; Y10T 409/108427
See application file for complete search history.

(56) References Cited

U.S. PATENT DOCUMENTS 5,000,632 A * 3/1991 Stadtfeld .................. B23F 9/10
409/26
5,598,618 A 2/1997 Aquino et al.
(Continued)

FOREIGN PATENT DOCUMENTS

DE 19806608 A1 9/1999

OTHER PUBLICATIONS

Hermle B, "Moderne Fertigungstechnik schafft neue Zahngeometrien: 5-Achs-Fräsen statt klassischer Verzahnbearbeitung", VDI Z, Springer VDI Verlag, DE,vol. 152, No. 1-2, Jan. 1, 2010 (Jan. 1, 2010), p. 28-30.

(Continued)

Primary Examiner — Jacob J Cigna
Assistant Examiner — Michael W Hotchkiss
(74) Attorney, Agent, or Firm — Robert L. McDowell (57) ABSTRACT A method directed to gear cutting tools and gear cutter job consolidation resulting in a single cutter capable of cutting a plurality of different members of a part family. The method comprises a multi-step approach comprising a first step of defining a temporary master. A second step creates a virtual master which is especially well-suited for accommodating the requirements of the jobs in the consolidation variety. A third step determines cutting depths and optimized machine settings for all consolidation jobs using the virtual master.

5 Claims, 12 Drawing Sheets (51) Int. Cl.
*B23F 9/10* (2006.01)
*B23F 17/00* (2006.01)

(56) References Cited

U.S. PATENT DOCUMENTS

| | | | | |
|---|---|---|---|---|
| 5,662,514 A * | 9/1997 | Masseth | ................ | B23F 21/226 451/48 |
| 5,890,846 A * | 4/1999 | Clark | .................... | B23F 21/226 407/21 |
| 6,120,217 A | 9/2000 | Stadtfeld et al. | | |
| 6,311,590 B1 * | 11/2001 | Stadtfeld | ............... | B23F 21/226 82/1.11 |
| 6,609,858 B1 * | 8/2003 | Francis | ................. | B23F 21/226 407/113 |
| 6,712,566 B2 | 3/2004 | Stadtfeld et al. | | |
| 8,317,433 B2 * | 11/2012 | Durr | ....................... | B23F 9/105 407/21 |
| 8,388,281 B2 * | 3/2013 | Hunecke | ................ | B23F 9/105 409/26 |
| 9,339,880 B2 * | 5/2016 | Jia | ........................ | B23F 17/003 |
| 10,730,123 B2 * | 8/2020 | Stadtfeld | ............... | B23F 21/226 |
| 2007/0140798 A1 * | 6/2007 | Cole | ....................... | B23C 5/223 407/21 |
| 2009/0097934 A1 * | 4/2009 | Hsiao | ........................ | B23F 9/10 409/26 |
| 2010/0111629 A1 * | 5/2010 | Durr | ...................... | B23F 21/223 409/27 |
| 2012/0321404 A1 * | 12/2012 | Ribbeck | .................... | B23F 9/10 409/13 |
| 2013/0022424 A1 * | 1/2013 | Hsiao | .................... | B23F 21/226 409/8 |
| 2018/0264569 A1 * | 9/2018 | Stadtfeld | ................... | B24B 3/06 |
| 2019/0022779 A1 * | 1/2019 | Stadtfeld | ................... | B23C 5/22 |

OTHER PUBLICATIONS

Goldrich, Robert N.,"CNC Generation Of Spiral Bevel And Hypoid Gears: Theory And Practice", The Gleason Works, Rochester, NY, 1990.
International Search Report and Written Opinion for PCT/US2018/041916, ISA/EPO, dated Oct. 30, 2018, 12 pgs.

* cited by examiner

UNICAL BLADE CONSOLIDATION SUMMARY v. 1.0
COPYRIGHT (c) 2017 THE GLEASON WORKS
DATE: 07-06-17   TIME: 16:14:42

1. SUMMARY:
2.

GLEASON PINION CUTTER CONSOLIDATION

JOB DIMENSION LIST WITH PINION DATA     VIRTUAL MASTER IS USED

| JOB1 | JOB2 | JOB3 | JOB4 | JOB5 | JOB6 | JOB7 | JOB8 | JOB9 | JOB10 |
|---|---|---|---|---|---|---|---|---|---|
| 100 | 101 | 102 | 103 | 104 | 105 | 106 | 107 | | |
| 10x43 | 10x41 | 11x39 | 11x41 | 11x43 | 9x41 | 8x39 | 7x41 | 0x 0 | 0x 0 |

HYPOID OFFSET [mm]

| 28.58 | 28.58 | 28.58 | 28.58 | 28.57 | 28.58 | 28.58 | 28.58 | .00 | .00 |
|---|---|---|---|---|---|---|---|---|---|

CUTTING METHOD

| HOB | HOB | HOB | HOB | HOB | HOB | HOB | HOB | | |
|---|---|---|---|---|---|---|---|---|---|

CUTTER HEAD TYPE [RADIUS-STARTS]

| 88-17 | 88-17 | 88-17 | 88-17 | 88-17 | 88-17 | 88-17 | 88-17 | 0- 0 | 0- 0 |
|---|---|---|---|---|---|---|---|---|---|

PINION SPIRAL ANGLE [deg] neg. sign -> LH                below: DEVIATION FROM AVERAGE

| -50.00 | -50.00 | -50.00 | -50.00 | -50.00 | -50.00 | -50.00 | -50.00 | .00 | .00 |
|---|---|---|---|---|---|---|---|---|---|
| .00 | .00 | .00 | .00 | .00 | .00 | .00 | .00 | .00 | .00 |

WHOLE DEPTH [mm]                                          below: DEVIATION FROM AVERAGE

| 9.58 | 9.80 | 10.55 | 9.80 | 9.35 | 9.32 | 9.54 | 9.69 | .00 | .00 |
|---|---|---|---|---|---|---|---|---|---|
| -.12 | .10 | .85 | .09 | -.36 | -.38 | -.16 | -.01 | .00 | .00 |

PINION FACE WIDTH [mm]                                    below: DEVIATION FROM AVERAGE

| 40.93 | 40.79 | 40.84 | 40.75 | 40.75 | 40.96 | 41.24 | 41.53 | .00 | .00 |
|---|---|---|---|---|---|---|---|---|---|
| -.05 | -.18 | -.13 | -.22 | -.22 | -.02 | .26 | .55 | .00 | .00 |

PINION INCLUDED BLADE PRESSURE ANGLE [deg]                below: DEVIATION FROM AVERAGE

| 45.20 | 45.42 | 45.70 | 45.43 | 45.20 | 45.42 | 45.74 | 45.43 | .00 | .00 |
|---|---|---|---|---|---|---|---|---|---|
| -.25 | -.02 | .26 | -.02 | -.24 | -.02 | .30 | -.01 | .00 | .00 |

PINION POINT WIDTH AT TOE [mm]                            below: DEVIATION FROM AVERAGE

| 1.37 | 1.78 | 1.76 | 1.79 | 1.60 | 2.17 | 2.66 | 1.84 | .00 | .00 |
|---|---|---|---|---|---|---|---|---|---|
| -.50 | -.09 | -.11 | -.08 | -.27 | .30 | .79 | -.03 | .00 | .00 |

PINION CUTTER OFFSET ANGLE [deg]

| 22.88 | 24.04 | 25.31 | 24.04 | 22.90 | 24.00 | 25.38 | 24.03 | .00 | .00 |
|---|---|---|---|---|---|---|---|---|---|

POINT WIDTH AT TOE AFTER CONSOLIDATION APPROX. [mm]

| 1.32 | 1.62 | 1.95 | 1.63 | 1.33 | 1.59 | 1.92 | 1.58 | .00 | .00 |
|---|---|---|---|---|---|---|---|---|---|

DEPTH CORRECTION REQUIRED TO KEEP SIZE [mm]  (+) -> DEEP;  (-) -> SHALLOW

| .066 | .192 | -.226 | .197 | .327 | .699 | .885 | .307 | .000 | .000 |
|---|---|---|---|---|---|---|---|---|---|

FIG. 7

UNICAL BLADE CONSOLIDATION SUMMARY v. 1.0
COPYRIGHT (c) 2017 THE GLEASON WORKS
DATE: 07-06-17     TIME: 16:14:42

1. SUMMARY:
2.

GLEASON GEAR CUTTER CONSOLIDATION

JOB DIMENSION LIST WITH GEAR DATA     VIRTUAL MASTER IS USED

| JOB1 | JOB2 | JOB3 | JOB4 | JOB5 | JOB6 | JOB7 | JOB8 | JOB9 | JOB10 |
|---|---|---|---|---|---|---|---|---|---|
| 100 | 101 | 102 | 103 | 104 | 105 | 106 | 107 | | |
| 10x43 | 10x41 | 11x39 | 11x41 | 11x43 | 9x41 | 8x39 | 7x41 | 0x 0 | 0x 0 |

HYPOID OFFSET [mm]

| 28.58 | 28.58 | 28.58 | 28.58 | 28.57 | 28.58 | 28.58 | 28.58 | .00 | .00 |

CUTTING METHOD

| HOB | HOB | HOB | HOB | HOB | HOB | HOB | HOB | | |

CUTTER HEAD TYPE [RADIUS-STARTS]

| 88-17 | 88-17 | 88-17 | 88-17 | 88-17 | 88-17 | 88-17 | 88-17 | 0- 0 | 0- 0 |

GEAR SPIRAL ANGLE [deg] pos. sign -> LH          below: DEVIATION FROM AVERAGE

| 35.42 | 35.52 | 35.86 | 35.72 | 35.62 | 35.30 | 35.19 | 34.94 | .00 | .00 |
| -.03 | .07 | .42 | .28 | .17 | -.14 | -.26 | -.50 | .00 | .00 |

WHOLE DEPTH [mm]                             below: DEVIATION FROM AVERAGE

| 9.58 | 9.80 | 10.55 | 9.80 | 9.35 | 9.32 | 9.54 | 9.69 | .00 | .00 |
| .00 | .00 | .00 | .00 | .00 | .00 | .00 | .00 | .00 | .00 |

GEAR FACE WIDTH [mm]                         below: DEVIATION FROM AVERAGE

| 36.58 | 36.58 | 36.58 | 36.58 | 36.58 | 36.58 | 36.58 | 36.58 | .00 | .00 |
| .00 | .00 | .00 | .00 | .00 | .00 | .00 | .00 | .00 | .00 |

GEAR INCLUDED BLADE PRESSURE ANGLE [deg]     below: DEVIATION FROM AVERAGE

| 45.23 | 45.45 | 45.73 | 45.45 | 45.23 | 45.44 | 45.74 | 45.45 | .00 | .00 |
| -.23 | -.01 | .26 | -.01 | -.23 | -.02 | .27 | -.02 | .00 | .00 |

GEAR POINT WIDTH AT TOE [mm]                 below: DEVIATION FROM AVERAGE

| 3.39 | 3.38 | 3.34 | 3.38 | 3.39 | 3.39 | 3.35 | 3.37 | .00 | .00 |
| .01 | .00 | -.03 | .01 | .02 | .01 | -.03 | .00 | .00 | .00 |

GEAR CUTTER OFFSET ANGLE [deg]

| -22.88 | -24.04 | -25.31 | -24.04 | -22.90 | -24.00 | -25.38 | -24.03 | .00 | .00 |

POINT WIDTH AT TOE AFTER CONSOLIDATION APPROX. [mm]

| 2.87 | 3.17 | 3.47 | 3.17 | 2.87 | 3.16 | 3.48 | 3.16 | .00 | .00 |

DEPTH CORRECTION REQUIRED TO KEEP SIZE [mm] (+) -> DEEP; (-) -> SHALLOW

| .612 | .247 | -.158 | .248 | .614 | .274 | -.157 | .251 | .000 | .000 |

FIG. 8

ORIGINAL BLADE GRINDING SUMMARY of Job 102

GLEASON BLADE PROFILE GRINDING SUMMARY v. 3.0
COPYRIGHT (c) 2016 THE GLEASON WORKS
07-06-17   16:30:29

1. SUMMARY: EXAMPLE JOB NAME 102
2.

PINION BLADE SPECIFICATIONS

| | | |
|---|---|---|
| 3. CUTTER DIAMETER AT REF POINT | 174.961MM | 176.206MM |
| 4. NO. OF BLADES PER SIDE | 17 | |
| 5. CUTTER NUMBER | 1323134 | |
| 6. HAND OF CUTTER | LEFT | |
| 7. TYPE OF BLADES | PENTAC 3-FACE BB | |
| POINT WIDTH | 1.688 mm | |
| CUTTING DEPTH | 10.549 mm | |
| TOP WIDTH IN PCT OF PT WIDTH | 82.224 | |
| CALC. SOFTWARE | UCAL-MULTIFACE | |

| BLADE DATA | OUTSIDE | INSIDE |
|---|---|---|
| 01. BLADE PRESSURE ANGLE | 23.279deg | 21.108deg |
| 02. BLADE CLEARANCE ANGLE | 12.142deg | 9.324deg |
| 03. BLADE DEDENDUM | 5.861 mm | 6.089 mm |
| 04. RADIUS OF CURVATURE - P.A. | 1270.000 mm | 1270.000 mm |
| 05. RADIUS OF CURVATURE - CLEAR | .000 mm | .000 mm |
| 06. EDGE RADIUS PRESS. ANG. SIDE | .635 mm | .635 mm |
| 07. EDGE RADIUS CLEARANCE SIDE | .635 mm | .635 mm |
| 08. BLADE DISTANCE | 4.154 mm | 7.161 mm |
| 09. BLADE TOP WIDTH | 1.388 mm | 1.388 mm |
| 10. TOPREM DEPTH | 1.913 mm | 2.141 mm |
| 11. TOPREM ANGLE | 3.500deg | 3.500deg |
| 12. CLEARANCE SIDE TOPREM DEPTH | .000 mm | .000 mm |
| 13. CLEARANCE SIDE TOPREM ANGLE | .000deg | .000deg |
| 14. RELIEF ANGLE P.A. SIDE | 5.514deg | 12.723deg |
| 15. RELIEF ANGLE CLEAR SIDE | 8.486deg | 1.277deg |
| 16. AXIAL GRID DEPTH | 13.714 mm | 13.714 mm |
| 17. TOP RELIEF ANGLE | 16.000deg | 16.000deg |
| 18. TOP SLOPE ANGLE | -2.337deg | 2.337deg |
| 19. BLADE SLOT TILT ANGLE | 12.000deg | 12.000deg |
| 20. BLADE SIDE RAKE ANGLE | 9.084deg | -.227deg |
| 21. BLADE WIDTH | 12.700 mm | 12.700 mm |
| 22. BLADE THICKNESS | 10.160 mm | 10.160 mm |
| Face1. BLADE FRONT HOOK ANGLE | 8.026deg | 8.246deg |
| Face2. BLADE FRONT FACE DISTANCE | 3.198 mm | 2.736 mm |
| Face3. BLADE FRONT AXIAL GRIND DEPTH | 16.862 mm | 17.090 mm |
| 26. BLADE FLAT WIDTH | .762 mm | .762 mm |
| 27. SHOULDER RADIUS | 1.000 mm | 1.000 mm |
| 28. SHOULDER ANGLE | 10.000deg | 10.000deg |
| 29. CLEARANCE SIDE SHOULDER RADIUS | 1.000 mm | 1.000 mm |
| 30. CLEARANCE SIDE SHOULDER ANGLE | 10.000deg | 10.000deg |
| BLADE HEIGHT ABOVE HEAD | 16.862 mm | 17.090 mm |
| OVERALL CUTTER HEIGHT | 105.762 mm | 105.990 mm |
| CUTTER REFERENCE HEIGHT | 99.901 mm | |

BLADE GRINDING SUMMARY of Job 102C - after Consolidation

GLEASON BLADE PROFILE GRINDING SUMMARY v. 3.0
COPYRIGHT (c) 2016 THE GLEASON WORKS
07-06-17   16:29:57

1. SUMMARY: EXAMPLE JOB NAME 102
2.                    Consolidated Cutters

PINION BLADE SPECIFICATIONS

| | | |
|---|---|---|
| 3. CUTTER DIAMETER AT REF POINT | 174.961MM | 176.206MM |
| 4. NO. OF BLADES PER SIDE | 17 | |
| 5. CUTTER NUMBER | 1323134 | |
| 6. HAND OF CUTTER | LEFT | |
| 7. TYPE OF BLADES | PENTAC 3-FACE BB | |
| POINT WIDTH | 1.904 mm | |
| CUTTING DEPTH | 10.549 mm | |
| TOP WIDTH IN PCT OF PT WIDTH | 82.245 | |
| CALC. SOFTWARE | UCAL-MULTIFACE | |

| BLADE DATA | OUTSIDE | INSIDE |
|---|---|---|
| 01. BLADE PRESSURE ANGLE | 23.163deg | 20.977deg |
| 02. BLADE CLEARANCE ANGLE | 11.353deg | 8.555deg |
| 03. BLADE DEDENDUM | 5.643 mm | 5.861 mm |
| 04. RADIUS OF CURVATURE - P.A. | 1270.000 mm | 1270.000 mm |
| 05. RADIUS OF CURVATURE - CLEAR | .000 mm | .000 mm |
| 06. EDGE RADIUS PRESS. ANG. SIDE | .635 mm | .635 mm |
| 07. EDGE RADIUS CLEARANCE SIDE | .635 mm | .635 mm |
| 08. BLADE DISTANCE | 4.243 mm | 7.050 mm |
| 09. BLADE TOP WIDTH | 1.604 mm | 1.604 mm |
| 10. TOPREM DEPTH | 1.918 mm | 2.136 mm |
| 11. TOPREM ANGLE | 3.500deg | 3.500deg |
| 12. CLEARANCE SIDE TOPREM DEPTH | .000 mm | .000 mm |
| 13. CLEARANCE SIDE TOPREM ANGLE | .000deg | .000deg |
| 14. RELIEF ANGLE P.A. SIDE | 5.536deg | 12.701deg |
| 15. RELIEF ANGLE CLEAR SIDE | 8.464deg | 1.299deg |
| 16. AXIAL GRID DEPTH | 13.714 mm | 13.714 mm |
| 17. TOP RELIEF ANGLE | 16.000deg | 16.000deg |
| 18. TOP SLOPE ANGLE | -2.334deg | 2.334deg |
| 19. BLADE SLOT TILT ANGLE | 12.000deg | 12.000deg |
| 20. BLADE SIDE RAKE ANGLE | 9.027deg | -.205deg |
| 21. BLADE WIDTH | 12.700 mm | 12.700 mm |
| 22. BLADE THICKNESS | 10.160 mm | 10.160 mm |
| Face1. BLADE FRONT HOOK ANGLE | 8.030deg | 8.251deg |
| Face2. BLADE FRONT FACE DISTANCE | 3.182 mm | 2.736 mm |
| Face3. BLADE FRONT AXIAL GRIND DEPTH | 16.643 mm | 16.862 mm |
| 26. BLADE FLAT WIDTH | .762 mm | .762 mm |
| 27. SHOULDER RADIUS | 1.000 mm | 1.000 mm |
| 28. SHOULDER ANGLE | 10.000deg | 10.000deg |
| 29. CLEARANCE SIDE SHOULDER RADIUS | 1.000 mm | 1.000 mm |
| 30. CLEARANCE SIDE SHOULDER ANGLE | 10.000deg | 10.000deg |
| BLADE HEIGHT ABOVE HEAD | 16.643 mm | 16.862 mm |
| OVERALL CUTTER HEIGHT | 105.543 mm | 105.762 mm |
| CUTTER REFERENCE HEIGHT | 99.901 mm | |

FIG. 9

ORIGINAL CUTTING SUMMARY
of Job 102

COPYRIGHT (c) 2016  GLEASON R&D - GEAR TECHNOLOGY
PINION GENERATED SUMMARY No.  EXAMPLE JOB NAME 102

| | | |
|---|---|---|
| CUTTER RADIUS . . . . . . . . . OB/IB | 87.48 mm | 88.10 mm |
| OUTSIDE BLADE ANGLE . . . . . . . . . | 23.770 deg | |
| INSIDE BLADE ANGLE . . . . . . . . . | 21.927 deg | |
| POINT WIDTH . . . . . . . . . . . . | 2.062 mm | |
| BLADE EDGE RADIUS . . . . . . . . . | .635 mm | |
| TOPREM LETTER . . . . . . . . . . . | | |
| BLADE DEPTH . . . . . . . . . . . | 13.714 mm | |
| HAND OF CUTTER . . . . . . . . . | LEFT | |
| TYPE OF CUTTER . . . . . . . . . | ALT./STD | |
| CUTTER BLADE SPACING . . . . . . . | STD | |
| NUMBER OF CUTTER BLADES . . . . . | 34 | |
| SUMMARY NUMBER - 538 / 300CG / BPG . . | [___] | |
| MAXIMUM CUTTER RPM / WORK RPM . . . | 750 / 375 | |
| PHOENIX SUMMARY SETTINGS . . . . . . | 275 / 280 / 600 | |

1. PART NUMBER . . . . . . . . . . . .
2. SUMMARY NUMBER . . . . . . . . . . EXAMPLE JOB
3. NUMBER OF TEETH . . . . . . . . . . 11
4. MEAN RADIUS . . . . . . . . . . . 38.421 mm
5. HAND OF SPIRAL . . . . . . . . . . LEFT
6. MOUNTING DISTANCE (SEE PART PRINT) . [___.__] mm
7. ARBOR DISTANCE (SEE LABEL ON ARBOR). [___.__] mm
8. HOB/MILL/STRAIGHT . . . . . . . . FACE-HOB
9. GEN/NON-GEN/HELIX . . . . . . . . GEN
10. SINGLE-ROLL/DOUBLE-ROLL . . . . . SINGLE
11. DUAL ROTATION . . . . . . . . . . OFF
12. INDEX INTERVAL (SKIP INDEX) . . . . . -
13. WORK AXIS POSITION . . . . . . . [___.__] deg 15. HAND OF CUTTER . . . . . . . . . LEFT
16. NUMBER OF BLADE GROUPS . . . . . 17
17. CUTTER REFERENCE HEIGHT . . . . . 99.901 mm
18. 1ST CUTTER RPM . . . . . . . . . 387 RPM
19. 2ND CUTTER RPM . . . . . . . . . 387 RPM
20. PWR IN EXCESS OF IDLE-HP . . . . .
21. FEED . . . . . . . . . . . . . . ON
22. MODIFIED ROLL . . . . . . . . . . OFF
23. HELICAL MOTION . . . . . . . . . OFF
24. VERTICAL MOTION . . . . . . . . . OFF 26. RADIAL DISTANCE . . . . . . . . . 127.304 mm ⇔
27. TILT ANGLE . . . . . . . . . . . 25.143 deg ⇔
28. SWIVEL ANGLE . . . . . . . . . 319.344 deg ⇔
29. WORK OFFSET . . . . . . . . . 28.557 mm
30. MACHINE ROOT ANGLE . . . . . . . .112 deg
31. MACHINE CENTER TO CROSSING PT . . -.077 mm
32. SLIDING BASE . . . . . . . . . . 29.100 mm ⇔
33. RATIO OF ROLL . . . . . . . . . 3.545433
34. CENTER ROLL POSITION . . . . . . 56.075 deg ⇔

CUTTING SUMMARY
of Job 102C - after Consolidation

COPYRIGHT (c) 2016  GLEASON R&D - GEAR TECHNOLOGY
PINION GENERATED SUMMARY No.  EXAMPLE JOB NAME 102
Consolidated Cutters

| | | |
|---|---|---|
| CUTTER RADIUS . . . . . . . . . OB/IB | 87.48 mm | 88.10 mm |
| OUTSIDE BLADE ANGLE . . . . . . . . . | 23.653 deg | |
| INSIDE BLADE ANGLE . . . . . . . . . | 21.789 deg | |
| POINT WIDTH . . . . . . . . . . . . | 2.273 mm | |
| BLADE EDGE RADIUS . . . . . . . . . | .635 mm | |
| TOPREM LETTER . . . . . . . . . . . | | |
| BLADE DEPTH . . . . . . . . . . . | 13.714 mm | |
| HAND OF CUTTER . . . . . . . . . | LEFT | |
| TYPE OF CUTTER . . . . . . . . . | ALT./STD | |
| CUTTER BLADE SPACING . . . . . . . | STD | |
| NUMBER OF CUTTER BLADES . . . . . | 34 | |
| SUMMARY NUMBER - 538 / 300CG / BPG . . | [___] | |
| MAXIMUM CUTTER RPM / WORK RPM . . . | 750 / 375 | |
| PHOENIX SUMMARY SETTINGS . . . . . . | 275 / 280 / 600 | |

1. PART NUMBER . . . . . . . . . . . .
2. SUMMARY NUMBER . . . . . . . . . . EXAMPLE JOB
3. NUMBER OF TEETH . . . . . . . . . . 11
4. MEAN RADIUS . . . . . . . . . . . 38.421 mm
5. HAND OF SPIRAL . . . . . . . . . . LEFT
6. MOUNTING DISTANCE (SEE PART PRINT) . [___.__] mm
7. ARBOR DISTANCE (SEE LABEL ON ARBOR). [___.__] mm
8. HOB/MILL/STRAIGHT . . . . . . . . FACE-HOB
9. GEN/NON-GEN/HELIX . . . . . . . . GEN
10. SINGLE-ROLL/DOUBLE-ROLL . . . . . SINGLE
11. DUAL ROTATION . . . . . . . . . . OFF
12. INDEX INTERVAL (SKIP INDEX) . . . . . -
13. WORK AXIS POSITION . . . . . . . [___.__] deg 15. HAND OF CUTTER . . . . . . . . . LEFT
16. NUMBER OF BLADE GROUPS . . . . . 17
17. CUTTER REFERENCE HEIGHT . . . . . 99.901 mm
18. 1ST CUTTER RPM . . . . . . . . . 387 RPM
19. 2ND CUTTER RPM . . . . . . . . . 387 RPM
20. PWR IN EXCESS OF IDLE-HP . . . . .
21. FEED . . . . . . . . . . . . . . ON
22. MODIFIED ROLL . . . . . . . . . . OFF
23. HELICAL MOTION . . . . . . . . . OFF
24. VERTICAL MOTION . . . . . . . . . OFF 26. RADIAL DISTANCE . . . . . . . . . 127.310 mm
27. TILT ANGLE . . . . . . . . . . . 25.148 deg
28. SWIVEL ANGLE . . . . . . . . . 319.364 deg
29. WORK OFFSET . . . . . . . . . 28.557 mm
30. MACHINE ROOT ANGLE . . . . . . . .112 deg
31. MACHINE CENTER TO CROSSING PT . . -.077 mm
32. SLIDING BASE . . . . . . . . . . 29.087 mm
33. RATIO OF ROLL . . . . . . . . . 3.545433
34. CENTER ROLL POSITION . . . . . . 56.073 deg

BEVEL GEAR CUTTER AND BLADE CONSOLIDATION

FIELD OF THE INVENTION

The invention is directed to cutting tools for bevel and hypoid gears and in particular to cutting tools that can cut different members of a part family.

BACKGROUND OF THE INVENTION

Bevel and hypoid gears can be cut in a single indexing process (face milling) or in a continuous indexing process (face hobbing). The bevel gear cutting processes, known in the art, position the cutter head in space such that the silhouette of the cutter blades represent one tooth of the theoretical generating gear while the cutter rotates. Common face cutters for bevel gear cutting have several blade groups with each group having between one and four blades. Most common are alternating (completing) cutters such as cutter 2 shown in FIG. 1 with one outside blade 10 and one inside blade 11 per blade group 12. The cutting blades 10 and 11 have the general form of a bar or stick and may comprise a five sided cross section (e.g. U.S. Pat. No. 6,120,217) but alternatively may have another cross-sectional shape such as a square, rectangular, semi-circular or circular.

In many industrial applications, certain gearset designs (jobs) belong to a part family. The term "part family" implies a group of gearsets (i.e. pinion and ring gear) which are very similar with certain small differences. Those differences may be, for example, the ratio between the two mating gear members which is realized with different combinations of the pinion tooth number and the ring gear tooth number.

Another potential parameter which can differ between the members of the part family is the hypoid offset which in turn causes the pinion spiral angles to be different for each different offset, even though the spiral angle of the ring gears is identical. In some cases certain optimizations of the tooth contact geometry have been applied in order to adjust particular members of the part family to different duty cycles or application requirements.

Figure 1:
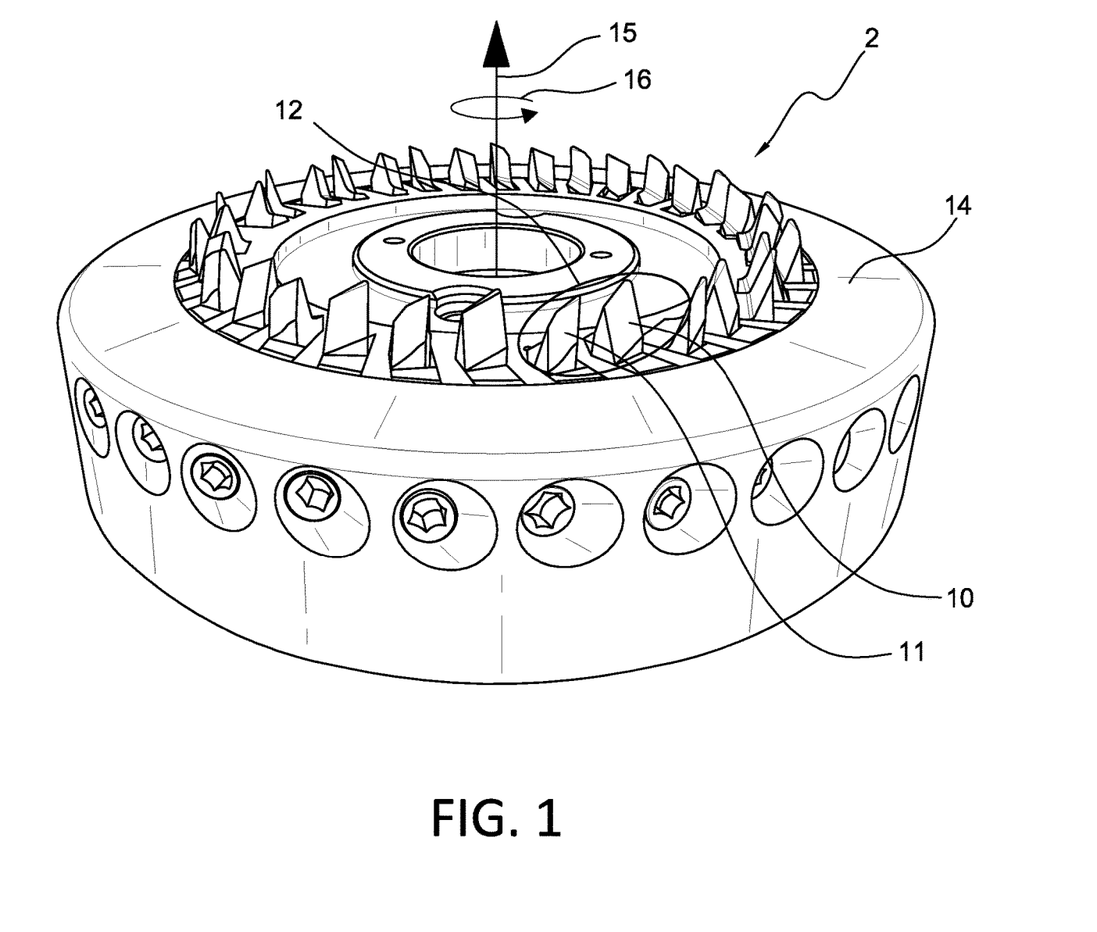
FIG. 1 shows the three-dimensional view of a face cutter head as it is used for bevel gear cutting.

All of the mentioned differences between the members of a part family will result in slightly different cutting blade geometries. In mostly all common cases, the same cutter head type is used across one part family. Cutter head type refers to the nominal cutter diameter which positions the blades radially. In the continuous indexing face hobbing process, the number of blade groups and additional cutter design specific parameters are also important factors because they have an influence on the produced tooth flank forms. In the face hobbing process, a right hand cutter head as shown in FIG. 1 is used to cut the right hand member of a gearset while it rotates in direction 16. The mate of the right hand member is a left hand member and therefore requires a left hand cutter head, which is a mirror image of the right hand cutter head (mirrored in a plane which is perpendicular to the cutter head rotation axis 15).

If the same cutting process is used (face hobbing or face milling) between the members of one part family and if the cutter type and cutter hands are also identical between the members of this part family, then the fact that each member requires a slightly different blade geometry seems to unnecessarily increase the cost of blade profile grinding and cutter head building as well as the logistical cost of cutter head handling between tool room and manufacturing machines.

Consolidations of the blade geometries of a number of jobs, which in most cases is ten or less, have been done in the past. The problem with the past consolidation procedures was the high amount of manual intervention required by a gear engineer. The past and present software only copies the cutter data of one job, which was selected as master job, into the data files of all other consolidation jobs which contain the machine, cutter geometry and kinematic data (e.g. known as a Special Analysis File or abbreviated SPA-file). The state of the art computer aid for the bevel gear cutter consolidation also performs some formal data adjustments to the files which receive the new master cutter and blade data in order to assure that the surface generation software and other programs for optimization and analysis will work in spite of the imported cutter data from one job.

After the automated part of today's cutter consolidation, the gear engineer will have to check each consolidated job for tooth thickness, cutting depth and tooth contact. Those geometrical properties will, in most realistic consolidation cases, be far away from the required values. The term "far away" refers to the impact of those geometrical properties to the physical properties of the gearsets which can cause deficiencies including:

Unacceptable tooth contact which will lead to edge contact and increased surface and root bending stress;
Increased operating noise;
Reduced efficiency.

Tooth contact pattern, tooth thickness and tooth cutting depth can be corrected within limits for each individual job of the consolidation by employing a variety of machine settings and machine kinematics.

Depending on the results of the analysis software, the blade parameters such as protuberance, edge radius and cutting edge curvature radius have to be evaluated and changed. Those blade geometry related parameters can only be changed on all jobs simultaneously because the cutter and blade data of all jobs have to be identical. The common procedure is to change one parameter for the job on which it has the most negative influence and then apply this change to all cutters and blade data of the remaining jobs. After those changes, all the analysis has to be repeated which then commonly pinpoints a different job which shows deficiencies caused by the just changed parameter or by one of the remaining parameters. This manual iteration process which is controlled by human intuition is very time consuming and inefficient. The hundreds of different and constantly changing results are difficult to process by memory and intuition.

As a result of the inefficient and expensive consolidation procedure today, gear engineers try to avoid the job consolidations of existing part families.

SUMMARY OF THE INVENTION

The present method is directed to gear cutting tools and gear cutter job consolidation resulting in a single cutter capable of cutting a plurality of different members of a part family. The method comprises a multi-step approach comprising a first step of defining a temporary master. A second step creates a virtual master which is especially well-suited for accommodating the requirements of the jobs in the consolidation variety. A third step determines cutting depths and optimized machine settings for all consolidation jobs using the virtual master.

BRIEF DESCRIPTION OF THE DRAWINGS

FIG. 2(*a*) shows an overview of 10 pinion cutter heads 20 and 10 gear cutter heads 21 of 10 different jobs, Job 1 through Job 10. The 10 different pinion cutters 20 are consolidated to one single cutter 22 and the 10 different gear cutters 21 are consolidated to one single cutter 23.

FIG. 2(*b*) shows the principal cutter consolidation steps.

FIG. 4 shows the top view of a partial master cutter with the corresponding unrolled side view section of two preceding blades below.

FIG. 7 shows the consolidation output for the pinion jobs.

FIG. 8 shows the consolidation output for the gear jobs.

FIG. 9 shows a blade grinding summary before cutter consolidation and a blade grinding summary after cutter consolidation.

FIG. 10 shows a cutting summary before cutter consolidation and a cutting summary after cutter consolidation.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters or numbers to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

The inventive method of gear cutter job consolidation comprises a multi-step approach comprising a first step of defining a temporary master. A second step creates a virtual master which is especially well-suited for accommodating the requirements of the jobs in the consolidation variety. A third step determines cutting depths and optimized machine settings for all consolidation jobs using the virtual master.

FIG. 1 shows a three dimensional view of face cutter 2 comprising a cutter head 14 for bevel gear cutting in a continuous indexing face hobbing process. The cutter head in FIG. 1 includes cutting blades oriented in blade groups such as, for example, the circled blade group 12. Each blade group 12 consists of two cutting blades, one outside blade 10, for cutting and forming the concave flank of a pinion or a ring gear, and one inside blade 11, for cutting and forming the convex flank of a pinion or a ring gear. The cutter head is attached to a bevel gear cutting machine (e.g. the machine disclosed by U.S. Pat. No. 6,120,217) and rotates during the cutting process around its axis 15 in direction 16. In order to accommodate certain tooth flank surface modifications which result from the individual parameters of the gearset to be manufactured, the angles, shapes and radial location of the blade cutting edges of blades 10 and 11 will vary from job to job. Even small differences between jobs such as, for example, one or more teeth on the gear or a one degree difference in spiral angle will influence the cutting blade geometry in order to achieve optimal conditions for the one particular job.

At the time of conducting the design calculation of one particular gearset, the calculation algorithms and procedures utilized have no knowledge of other gearset designs which are similar and might even belong to one part family. Other gearset designs might have been created in the past or are planned to be conducted in the future. However, at the time of one individual gearset design and optimization, it is impossible for the gear engineer and for the gear computation software to relate this individual design to other past and future designs in order to communize the cutting blades of the new design with one or more of the other designs.

Figure 2A:
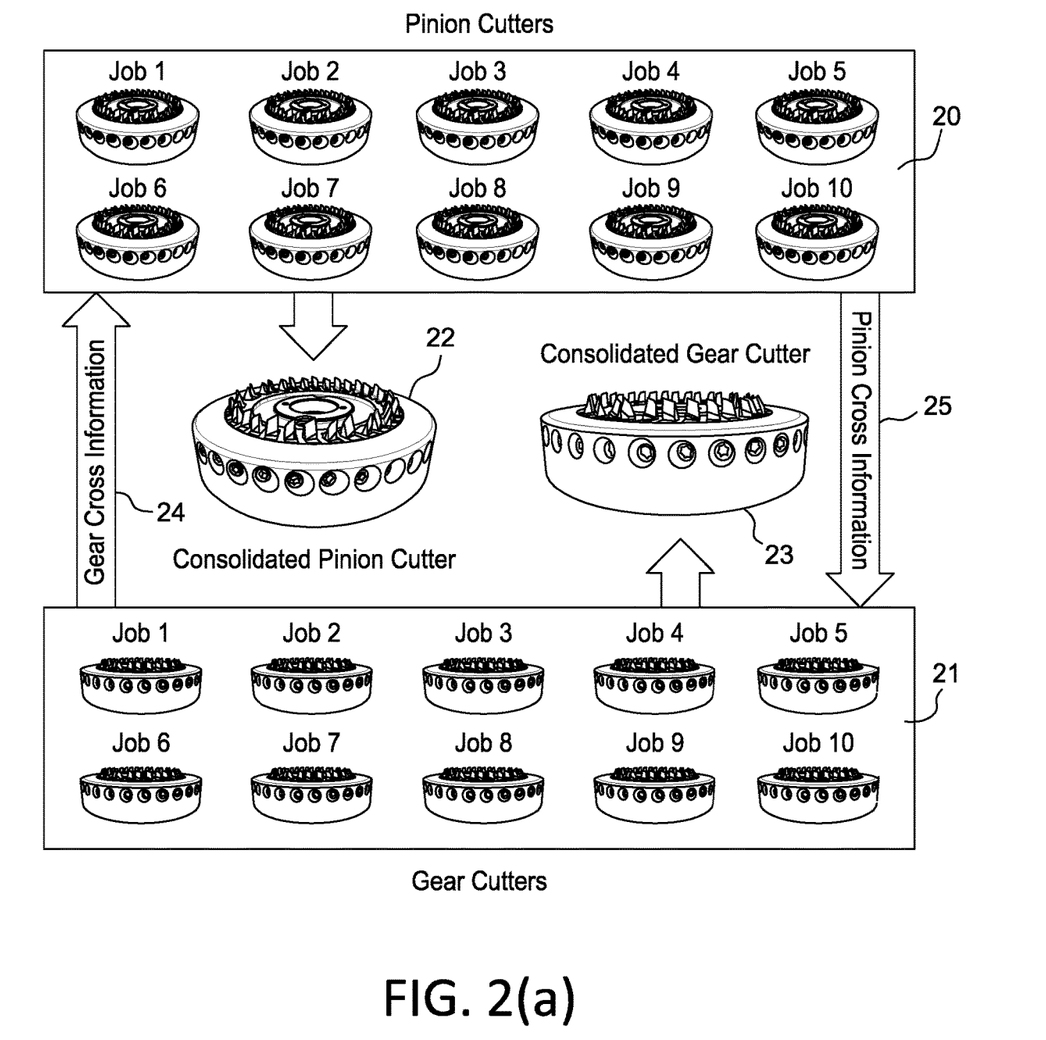

FIG. 2(*a*) shows a bock diagram for a global explanation of a cutter head consolidation task of ten different jobs, each with ten pinion cutter heads 20 and ten gear cutter heads 21. After the consolidation task, all of the ten pinion cutters 20 of Job 1 through Job 10, which have different blade geometry specifications, result in one single pinion cutter head 22 which features consolidated blade geometry. This consolidated blade geometry is capable of cutting the slots and forming the flank surfaces of the ten individual jobs which each have different gear design parameters. Also, after the consolidation task, all of the ten ring gear cutters 21 of Job 1 through Job 10, which have different blade geometry specifications, result in one single ring gear cutter head 23 which features consolidated blade geometry. The cross information 24 and 25 is required to assure the meshing conditions of the gearsets cut with the consolidated cutters are identical to, or at least close to, the meshing conditions of the gearsets cut with the original cutter and blade specifications.

Figure 2B:
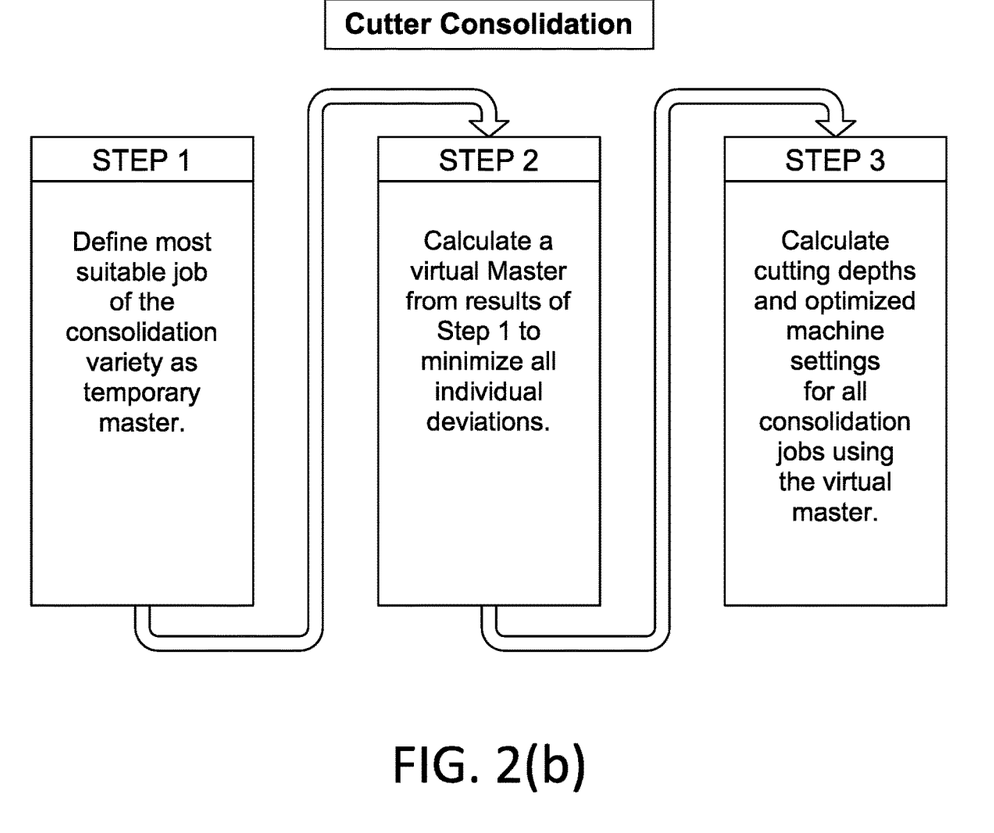

FIG. 2(*b*) shows the principal consolidation steps of the invention. Step 1 defines the most suitable job for the consolidation variety as temporary master. Step 2 calculates a virtual master from the results of step 1 to minimize all individual deviations. Step 3 calculates cutting depths and optimized machine settings for all consolidation jobs using the virtual master.

In the first step, all jobs of the consolidation variety are analyzed and a first temporary master job (cutter) is defined as one of the existing jobs of the consolidation variety, preferably the job that cuts the smallest root slot width of all jobs observed. Then the cutters of all other jobs are compared more specifically to the temporary master. In particular, with reference to FIG. 4, the normal blade radii $R_{W1-j}$ and $R_{W1Cons}$ as well as $R_{W1-j}$ and $R_{W1Cons}$ and the spacing between the outside blades 74 and 75 and the inside blades 76 and 77 are compared at equal blade dedendums 78 and 79. The results are the specific slot width or tooth thickness variations which would be caused in each individual job if the temporary master cutter would be used in connection with the original basic settings of each job.

The skilled artisan is well aware that the relationship between a workpiece and the theoretical generating gear can be defined by a group of parameters known as basic settings. These basic settings communicate a sense of size and proportion regarding the theoretical generating gear and the workpiece and provide a common starting point for gear design thus unifying design procedures among many models of machines. The basic settings totally describe the relative positioning between the tool and workpiece at any instant. For example, see Goldrich, "CNC Generation of Spiral Bevel and Hypoid Gears: Theory and Practice", The Gleason Works, Rochester, N.Y., 1990.

The basic settings of each job, except the temporary master job, are modified in order to eliminate the tooth thickness variation. This is preferably accomplished by axial cutter head vector shifts (principle shown in FIG. 6). The symmetry vector between the outside and inside blades of each individual member is compared to the blade symmetry vector of the same member of the temporary master job. The discrepancy of the symmetry vector directions is used to calculate a basic setting change of each individual member of each job in order to minimize contact position changes between the original job and the consolidated version of the same job. The inventive consolidation procedure uses a different temporary master for the pinion and ring gear cutter consolidation. Different masters have a significant positive impact on the quality of the consolidation results.

The second step of the inventive consolidation method creates a virtual master job. The virtual master job utilizes the same cutter head type as the jobs of the consolidation variety but uses cutter head and blade geometry parameters which are the result of an analysis of all jobs considered for the consolidation. Such a virtual cutter may be different than each of the consolidation jobs with all of its parameters except the number of blade groups. Due to the fact that the virtual master is not bound to the cutter and blade parameters of one particular consolidation job, it is possible to design the virtual cutter with its virtual blades such that the range of variation between each parameter of the virtual cutter and each cutter of the consolidation jobs is minimized.

The third step of the inventive cutter consolidation applies the virtual cutter head to all jobs of the consolidation variety and determines new machine settings for each job which assure the correct tooth thickness and a minimized pressure angle deviation compared to the original job and considering the interplay between pinion and gear.

The inventive process of cutter head consolidation is based on several key elements which make the virtual cutter head in its consolidation success a significant advance in bevel gear cutter head technology. The key elements include:

First parameter analysis and selection of the temporary master.

Communize all cutter reference heights (linked to the master blade dedendum).

Calculate the required amounts of axial cutter correction to achieve correct tooth thicknesses in preparation of the virtual cutter definition.

Virtual cutter blade pressure angles of pinion inside and outside blades as well as gear inside and outside blades average the respective angles on the respective blades of all consolidation cutters. An alternative possibility is to use the blade angles of the cutter which is the closest to average.

Blade radii of pinion inside and outside blades are calculated from the blade radii of the consolidation variety by altering them in order to archive semi-balanced amounts of deeper or shallower cutting. Semi-balanced means in this connection that deeper cutting of 80% and shallower cutting of 20% of the variation range is optimal for roll conditions and strength:

$$Rw_{1Cons}=Rw_{1WPmin}-D_{Slot}/2*F_{spp} \quad (1)$$

$$Rw_{2Cons}=Rw_{2WPmin}+D_{Slot}/2*F_{spp} \quad (2)$$

where:

$Rw_{1Cons}$ ... Radius of inside blade of consolidated cutter $Rw_{2Cons}$ ... Radius of outside blade of consolidated cutter $Rw_{1WPmin}$ ... Radius of inside blade of job with smallest pinion slot width $Rw_{2WPmin}$ ... Radius of outside blade of job with smallest pinion slot width $D_{Slot}$ ... Difference between the widest and the smallest slot with $F_{spp}$ ... Factor for semi-balancing, e.g. 0.80

If blade pressure angles from one particular cutter are used for the virtual master, then the blade angles of the pinion and gear have to come from the same job, even though none of the other cutter data of this particular job are used.

The symmetry vector between the outside and inside blades of each individual member is compared to the temporary master job and machine setting corrections are used to minimize the difference in tooth profile of the original jobs and the consolidated version of those jobs.

If it is required to use an effective point radius which results in a larger (or smaller) flank lead curvature for example on certain gear members, then the consolidation strategy considers that the mating pinion will also receive a larger (or smaller) lead curvature in order to maintain the original Ease-Off and tooth contact pattern within the limits of the physical possibilities.

Figure 3:
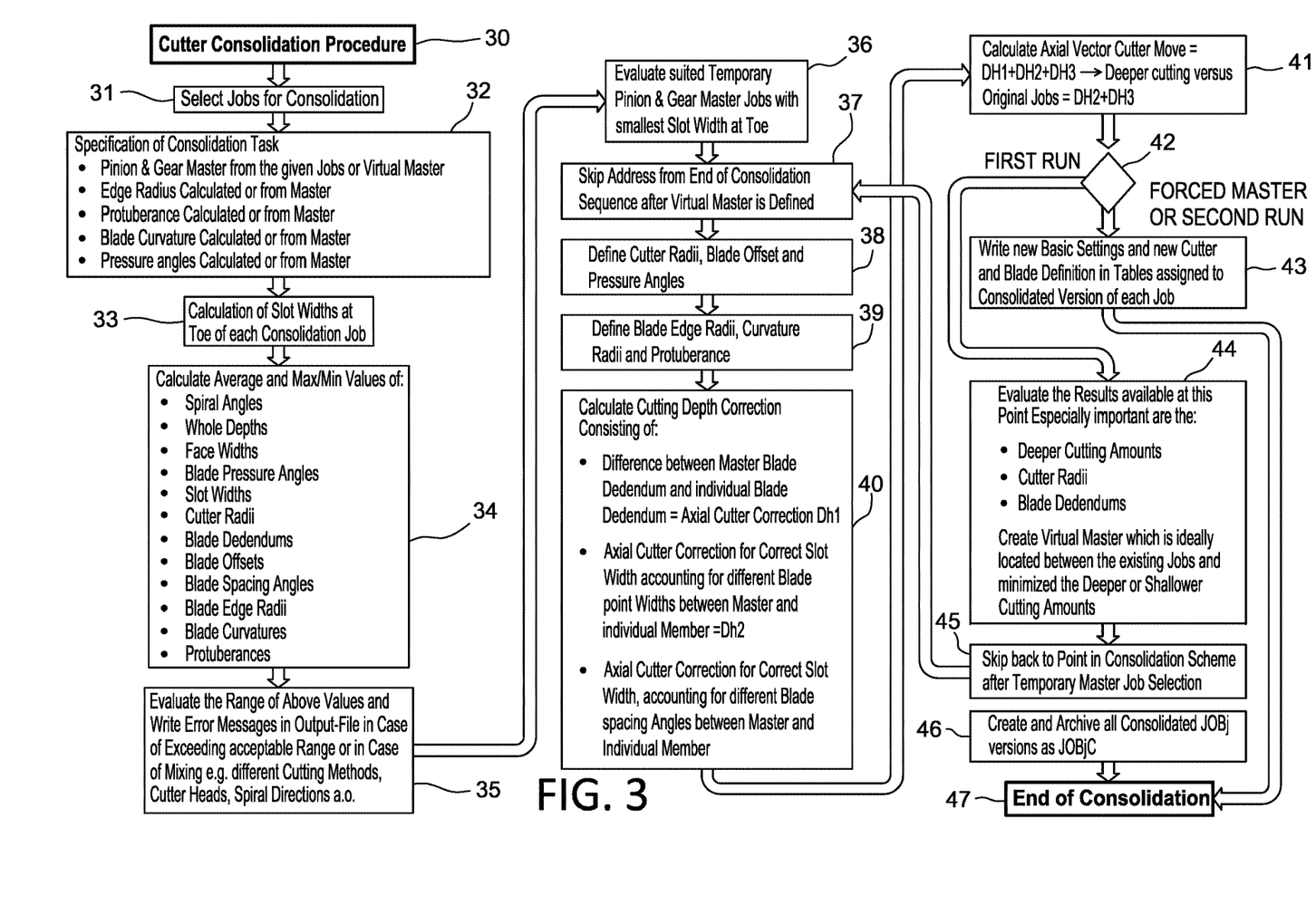
FIG. 3 shows a flow chart of the different steps required in order to accomplish the inventive consolidation task.

FIG. 3 shows a preferred flow chart of the cutter head consolidation 30. The different jobs which are selected to be subject of the consolidation are entered into the consolidation program such as via a user interface screen 31. Further input includes the specification of the consolidation task 32. The following options are preferably included:

Use one of the given jobs as temporary master, but allow the program to select this master.

Program will select different jobs for the pinion and ring gear temporary master if required for better results.

Force program to use one particular job as temporary master.

Allow program to create the optimal virtual master job.
Pressure angles from temporary master or average pressure angle is calculated.
Cutting edge curvature from temporary master or average curvature radius is calculated.
Protuberance from temporary master or average protuberance is calculated or certain percentage of maximum protuberance is used.
Edge radius from temporary master or average edge radius is calculated or certain percentage of maximum edge radius is used.

The calculation program begins to read the basic setting data files of the designated jobs and stores all required key data in data arrays. The first calculation step 33 is the computation of the slot width at the toe of each pinion and ring gear of the consolidation variety. The smallest slot width will determine which cutter of the consolidation variety can be used in order to cut all consolidation jobs without blade interference and tooth surface mutilation.

The next calculation step 34 is determining the average values and the maximal and minimal values of:
Spiral Angles
Whole Depths
Face Widths
Blade Pressure Angles
Slot Widths
Cutter Radii Blade Dedendums
Blade Offsets
Blade Spacing Angles
Blade Edge Radii
Blade Curvatures
Protuberances If the range between minimum and maximum values is larger than recommended for a consolidation, the program part 35 prompts a warning. If the range of values is acceptable, then the program defines in 36 the temporary master job as the pinion and ring gear job with the smallest slot width at the toe or uses the temporary master jobs which are forced by the input.

The next step 38 is the calculation of the cutter radii, blade offsets and blade pressure angles. In case of an input forced pinion and gear master, cutter radii, blade offsets and pressure angles from the selected masters are used without any calculation.

The following section 39 in the consolidation procedure defines the blade edge radii, the main cutting edge curvature radii and the protuberance parameters for the consolidated pinion and ring gear cutter head. Certain features of the temporary master job are changed to the average values of all jobs from the consolidation variety (if allowed by input) or adjusted in relation to the maximal value by a chosen factor. If, for example, the smallest edge radius is 0.2 mm and the largest edge radius is 1.0 mm then the average value of 0.6 mm is used for the temporary master job in case the edge radius switch is set to "0". In case the edge radius switch is set to "1", then the value of the job picked as temporary master is maintained for the master cutter. If the edge radius switch is set to "2", then an additional factor can be entered (e.g. 0.75) which will be multiplied with the largest edge radius, resulting in edge radii which are 75% of the maximum value of the consolidation variety.

If, for example, the protuberance angles of the consolidation variety is between 2 degrees and 4 degrees and the protuberance depth is between 1 mm and 3 mm then the user can choose the average values of 3 degrees protuberance angle and 2 mm protuberance depth (switch set to "0"), or set the switch to "1" which maintains the values of the job picked as temporary master. If the switch is set to "2", then an additional factor can be entered (e.g. 0.6) which will be multiplied with the largest protuberance angle and depth, resulting in a protuberance angle of 2.4 degrees and a protuberance depth of 1.8 mm (60% of the maximum values).

One key part of the consolidation is the calculation of the axial cutter position of each individual job 40 in order to accommodate the different blade reference height (blade dedendum) of the temporary master cutter and to assure cutting of the correct tooth thickness. First in 40, the dedendum difference between the blades of the individual cutter and the blades of the temporary master cutter is calculated as axial cutter correction value $DH1_j$:

$$DH1_j = -[(HF_{2Cons} + HF_{1Cons}) - (HF_{2\text{-}j} + HF_{1\text{-}j})]/2 \qquad (3)$$

Where:
$DH1_j$ . . . Individual blade dedendum correction
$HF_{1Cons}$ . . . Blade dedendum of inside blade of consolidated cutter
$HF_{2Cons}$ . . . Blade dedendum of outside blade of consolidated cutter
$HF_{1\text{-}i}$ . . . Blade dedendum of inside blade of individual consolidation job
$HF_{2\text{-}i}$ . . . Blade dedendum of outside blade of individual consolidation job In a second step in 40, the inventive method compares the blades in the temporary master cutter at the reference height 56 with the blades of the individual job (at the same reference height 78 equal 79). The radial differences between the blades of the individual jobs and the consolidated cutter (FIG. 4) are calculated in the cutting plane (planes perpendicular to drawing plane FIG. 4 and oriented in directions 51, 52, 53 and 54), which is perpendicular to the relative motion direction between cutter and work at the time of cutting. Because the cutter radii of the temporary master cutter have to accommodate the correct slot width for the individual consolidation jobs, an axial cutter correction $DH2_j$ (68 or 69) is calculated with:

$$DH2_j = -[(R_{W2Cons} - R_{W1Cons}) - (R_{W2\text{-}j} - R_{W1\text{-}j})]/[\tan(\alpha_{2Cons}) - \tan(\alpha_{1Cons})] \qquad (4)$$

Where:
$DH2_j$ . . . Individual blade point radius correction
$Rw_{1Cons}$ . . . Consolidated inside blade radius
$Rw_{2Cons}$ . . . Consolidated outside blade radius
$\alpha_{1Cons}$ . . . Inside pressure angle of consolidated blade
$\alpha_{2Cons}$ . . . Outside pressure angle of consolidated blade The third element of tooth thickness correction in 40 results from the blade spacing differences $\Delta_{\varphi_c}$ in FIG. 4 between individual consolidation cutter and the temporary master cutter. Blade spacing errors have only an influence onto the tooth thickness in the continuous indexing face hobbing process. FIG. 5 shows that $\Delta_{\varphi_c}$ leads to a tooth thickness error Ne.

$$Ne = \Delta_{\varphi_c} * Rc * \sin \delta_w \qquad (5)$$

Where:
Rc . . . Blade radius in cutter
$\delta_w$ . . . kinematic blade offset angle An equivalent axial cutter correction $DH3_j$ to eliminate the blade position related tooth thickness error Ne is calculated with:

$$DH3_j = -Ne/[\tan(\alpha_{2Cons}) + \tan(\alpha_{1Cons})] \qquad (6)$$

Where:
$DH3_j$ . . . Individual blade spacing correction

In order to achieve correct tooth thicknesses an axial cutter head correction of $DH_j$ is calculated as follows:

$$DH_j = DH1_j + DH2_j + DH3_j \quad (7)$$

The temporary master cutter head is now axially shifted in 41 for each of the consolidation jobs j by the amount $DH_j$ along its axis vector. A simplified graphical explanation of the axial cutter and blade profile move is given in FIG. 6.

At this point the consolidation procedure splits in 42 in either of the two possibilities:

1. In case of a forced master (or virtual master and second run) the program writes in 43 all basic settings and cutter definitions and archives in step 46 each consolidated JOBj under the new name JOBjC.

2. In case the virtual master is chosen (and first run) the program continues at 42 in a subroutine 44 which is devoted to create the ideal virtual master.

For the inventive virtual master, cutter radius and blade dedendums are based on the pinion and gear geometry with the smallest root slot with at the toe. Cutter radius and blade dedendums are now modified using the precise radius values at the individual blade reference points, used in equation (4). At this point the precise deeper cutting amounts are calculated and the blade point radii and blade dedendums are defined. The balance between deeper cutting and shallower cutting is calculated from the user input. If the user enters 20% of shallow cutting is allowed, the procedure arranges the range of jobs between 20% shallower cutting and 80% deeper cutting. The pressure angle of each blade kind (pinion inside and outside blade, gear inside and outside blade) are calculated as an average of all individual blade kinds (e.g. virtual pinion master inside blade pressure angle is the average of all pinion inside blades pressure angles).

After the virtual master has been defined in 45, the consolidation process continues at 37 where the process repeats steps 38, 39, 40, and 41. In contrast to the first run based on the temporary master, all calculations are now performed with the virtual master which will lead to a significant improvement of the consolidation success. The tests with the inventive consolidation method have shown that many job varieties which were not possible to successfully consolidate in the past can now be consolidated without sacrifice of the physical properties of the individual jobs. The process passes now through 42 to 43 and 46 and concludes the consolidation task.

Figure 4:
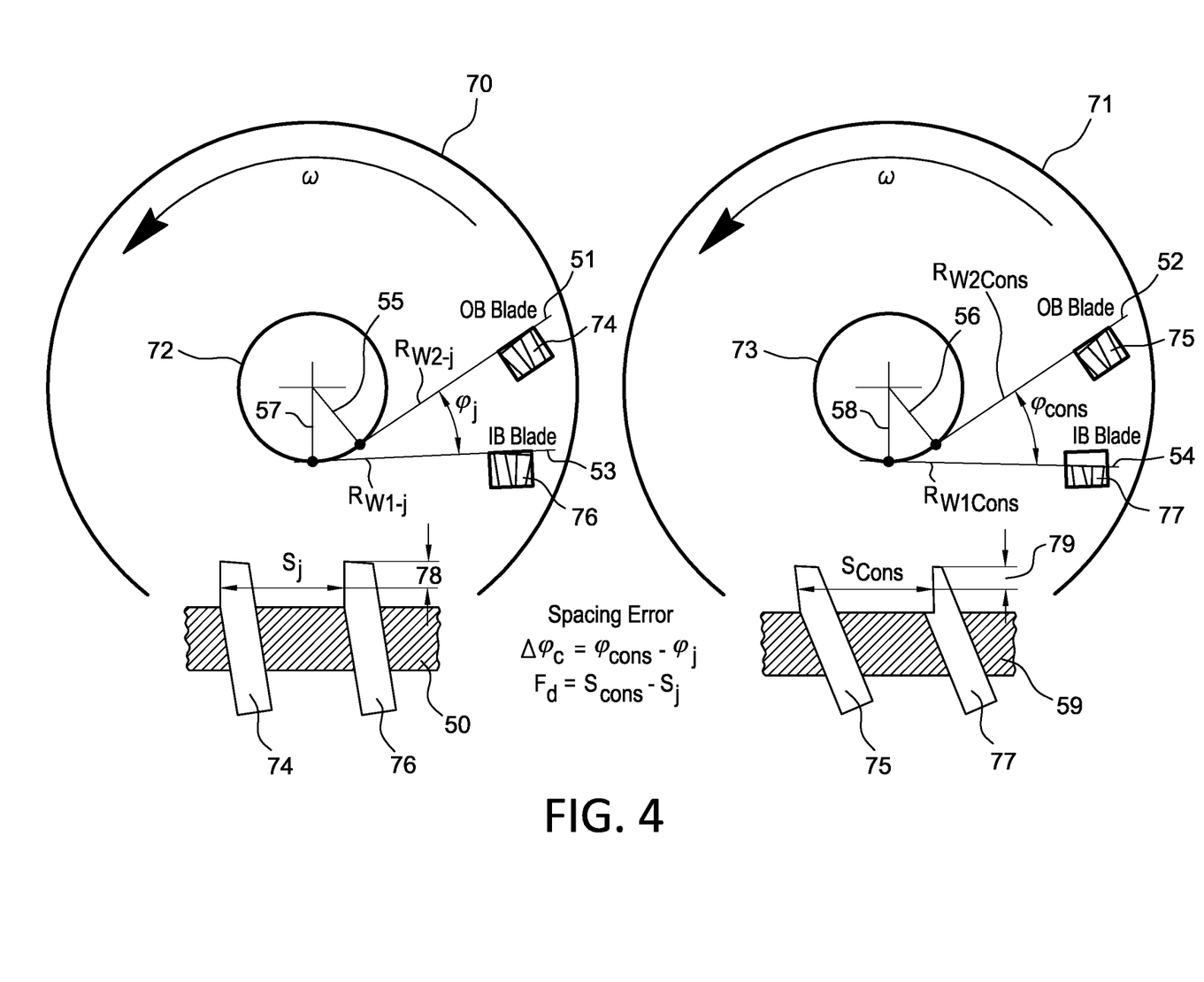
FIG. 4 shows to the left a top view of a partial cutter head of a consolidation variety and below an unrolled side view onto a section with two proceeding blades. To the right
Figure 5:
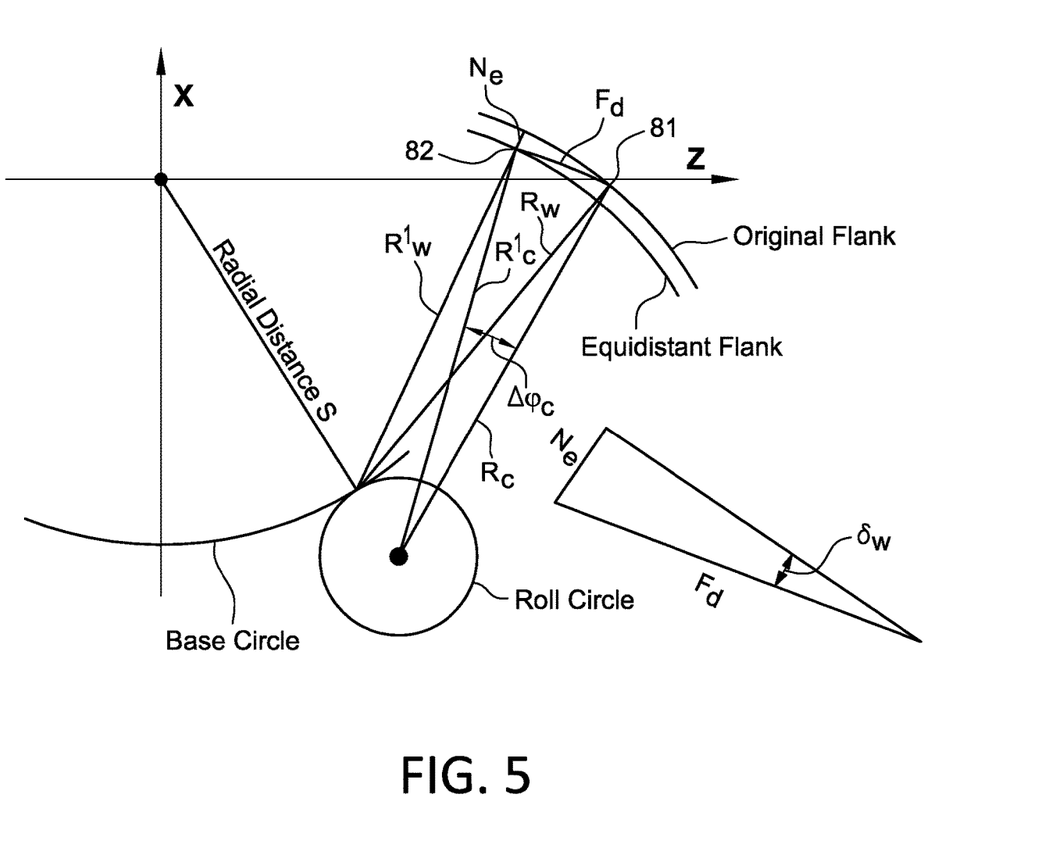
FIG. 5 shows the vector graphic of an example generating gear for bevel gear cutting in face hobbing. The graphic explains how a blade spacing error causes a change in tooth thickness in case of the face hobbing process.

FIG. 4 shows a front view onto one cutter head of the consolidation variety 70 and the consolidated temporary master cutter head 71. The blade offsets are labeled 55, 57, 56 and 58. Blade 74 has the normal radius $R_{W2\text{-}j}$ from the tangent point to the base circle 72 to the reference point of blade 74. Blade 76 has the normal radius $R_{W1\text{-}j}$ from the tangent point to the base circle 72 to the reference point of blade 76. Blade 75 has the normal radius $R_{W2Cons}$ from the tangent point to the base circle 73 to the reference point of blade 75. Blade 77 has the normal radius $R_{W1Cons}$ from the tangent point to the base circle 73 to the reference point of blade 77. 50 is an unrolled side view of a cutter head section of cutter 70 which contains the two proceeding blades 74 and 76. 59 is an unrolled side view of a cutter head section of cutter 71 which contains the two proceeding blades 75 and 77. At the blade dedendum 78 in section 50 the blade spacing of one individual job j is $S_j$.

For the depth adjustment calculation (value $DH3_j$) the blade spacing of the consolidated cutter 71 has to be determined at a distance from the tip which is equal to the blade dedendum 78. Section 59 shows the distance 79 from the tip of the consolidated cutter which is equal to the blade dedendum 78. $F_d = S_{Cons} - S_j$, (with $S = R*\varphi$, see also equation (5)) is used to calculate a depth correction which will compensate the tooth thickness discrepancy, caused by differences in blade spacing between individual cutter (and blades) and the consolidated master cutter with its blades. Sections 50 and 59 also show that it is possible to use different cutter head and blade geometries within the consolidation variety, provided that certain basics for example the number of cutter starts and the hand of the cutter heads are equal among each other.

FIG. 5 shows a two-dimensional view onto the generating gear of a face hobbed job. The roll circle represents the cutter and rolls on the base circle while the cutter head radius vectors $R_C$ and $R_W$ with their tip 81 trace the original flank line. A blade spacing error $\Delta_{\varphi_c}$ changes the location of the radius vectors to $R_c'$ and $R_W'$ with their common tip location 82 tracing the equidistant flank. The normal difference between original flank and equidistant flank is $N_e$ (see equation (5)). The error $N_e$ will cause a tooth thickness error and has to be corrected with an axial cutter shift as shown in equation (6).

Figure 6:
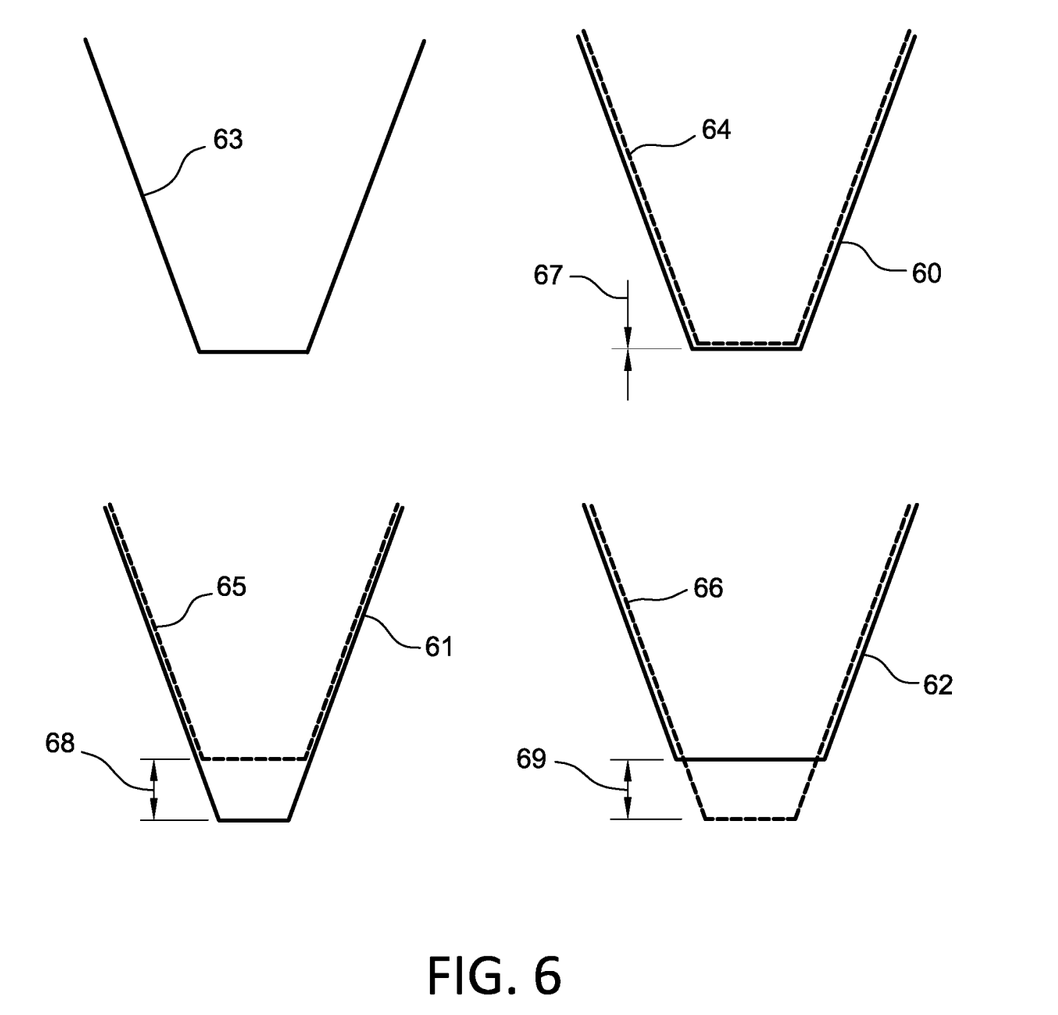
FIG. 6 shows a two-dimensional view of bevel gear reference profiles. The profile comparison explains the principle of deeper or shallower cutting in order to accommodate a given slot width while using a consolidated cutter.

FIG. 6 shows two-dimensional drawings of the temporary master profile 63 (64, 65 and 66) and sample profiles of consolidation jobs 60, 61 and 62. Profile 63 is the consolidated profile of the master job. Profile 63 is equal to the dashed profiles 64, 65 and 66. The dashed profiles visualize the axial cutter head correction required to achieve correct tooth thickness of individual jobs of the consolidation variety.

Profile 60 and profile 64 are congruent and the required axial cutter correction 67 is equal to zero. Profile 65 is drawn in profile 61 of another job from the consolidation variety. In order to match both profiles, an axial cutter head correction 68 is required. The cutter correction 68 will cut a shallow slot depth of the individual job with the profile 61. Profile 66 drawn inside of profile 62 requires an axial cutter head correction 69. Correction 69 produces a deeper cut slot of the individual job with profile 62.

FIG. 7 shows the consolidation output for the pinion jobs. The eight consolidation jobs are shown next to each other. The lines below summarize in table form:

Tooth counts
Hypoid offsets and deviation from average
Cutting methods
Cutter head types
Pinion spiral angles and deviation from average
Whole depth and deviation from average
Pinion face width and deviation from average
Included pinion blade pressure angle and deviation from average
Pinion point width and deviation from average
Required pinion depth correction versus original Jobs FIG. 8 shows the consolidation output for the ring gear jobs. The eight consolidation jobs are shown next to each other. The lines below summarize in table form:

Tooth counts
Hypoid offsets and deviation from average
Cutting methods
Cutter head types
Gear spiral angles and deviation from average
Whole depth and deviation from average
Gear face width and deviation from average
Included gear blade pressure angle and deviation from average
Gear point width and deviation from average
Required gear depth correction versus original jobs FIG. 9 (left side) shows a blade grinding summary before cutter consolidation, next to a blade summary after the cutter consolidation (FIG. 9, right side). The blade summaries after cutter consolidation are identical for all consolidated jobs. The consolidated blade summary is different than each individual unconsolidated summary of each job. For example, the arrows point to geometry influencing settings which are different. While FIG. 9 shows original and consolidated blade summary grinding data for a pinion, a consolidated blade grinding summary for mating ring gear members in the same part family is also produced by the invention.

FIG. 10 (left side) shows a cutting summary before cutter consolidation next to a cutting summary after cutter consolidation (FIG. 10, right side). The cutting summaries after cutter consolidation are different for each of the different jobs and are also different than each of the original unconsolidated cutting summaries. For example, the arrows point to basic settings which are different after the consolidation of a job.

Thus, the inventive method provides for a single consolidated cutter for cutting all members of a part family that were considered in the design of the consolidated cutter (e.g. Jobs 1-8 of FIGS. 7 and 8). The consolidated cutter is different than each of the specific individual cutters that would be necessary to separately cut each respective member (job) of the part family. Note the comparison arrows in FIG. 9. With each job to be cut with the consolidated cutter, the respective basic machine settings are modified for that specific job thereby resulting in a cut part that is identical to, or nearly identical to, the same part cut with a non-consolidated cutter designed and dedicated to cut only that particular part. However, with the consolidated cutter, only one cutter is needed for cutting a plurality of parts from a part family. It can be seen that savings in tool costs, engineering time and machine down time can be significant by utilizing the consolidated cutter of the invention.

With the information from the blade grinding summary after consolidation (e.g. FIG. 9, right side), the summary data is programmed into a grinding machine, such as the Blade Profile Grinder (BPG) machine commercially available from The Gleason Works, for producing the consolidated cutting blades for pinions. It can be understood that the appropriate consolidated blade grinding summary for ring gears is also programmed into the grinding machine for producing the consolidated cutting blades for the mating ring gears. These cutting blades may then be used to cut all members of the part family that were considered for the determination of the consolidated cutter (e.g. Jobs 1-8 of FIGS. 7 and 8).

With each job to be cut with the consolidated cutter, the respective consolidated cutting summary settings are input into a gear cutting machine (e.g. U.S. Pat. No. 6,712,566, commercially available from The Gleason Works) thereby resulting in a cut part that is identical to, or nearly identical to, the same part cut with a non-consolidated cutter designed and dedicated to cut only that particular part. The comparison arrows of FIG. 10 show small differences between basic settings of the original cutting summary for Job 102 (pinion #3 of FIG. 7) and the cutting summary after consolidation. For cutting another member of the part family, the respective consolidated cutting summary is input into the gear cutting machine but the cutter (consolidated) remains the same.

Figure 11:
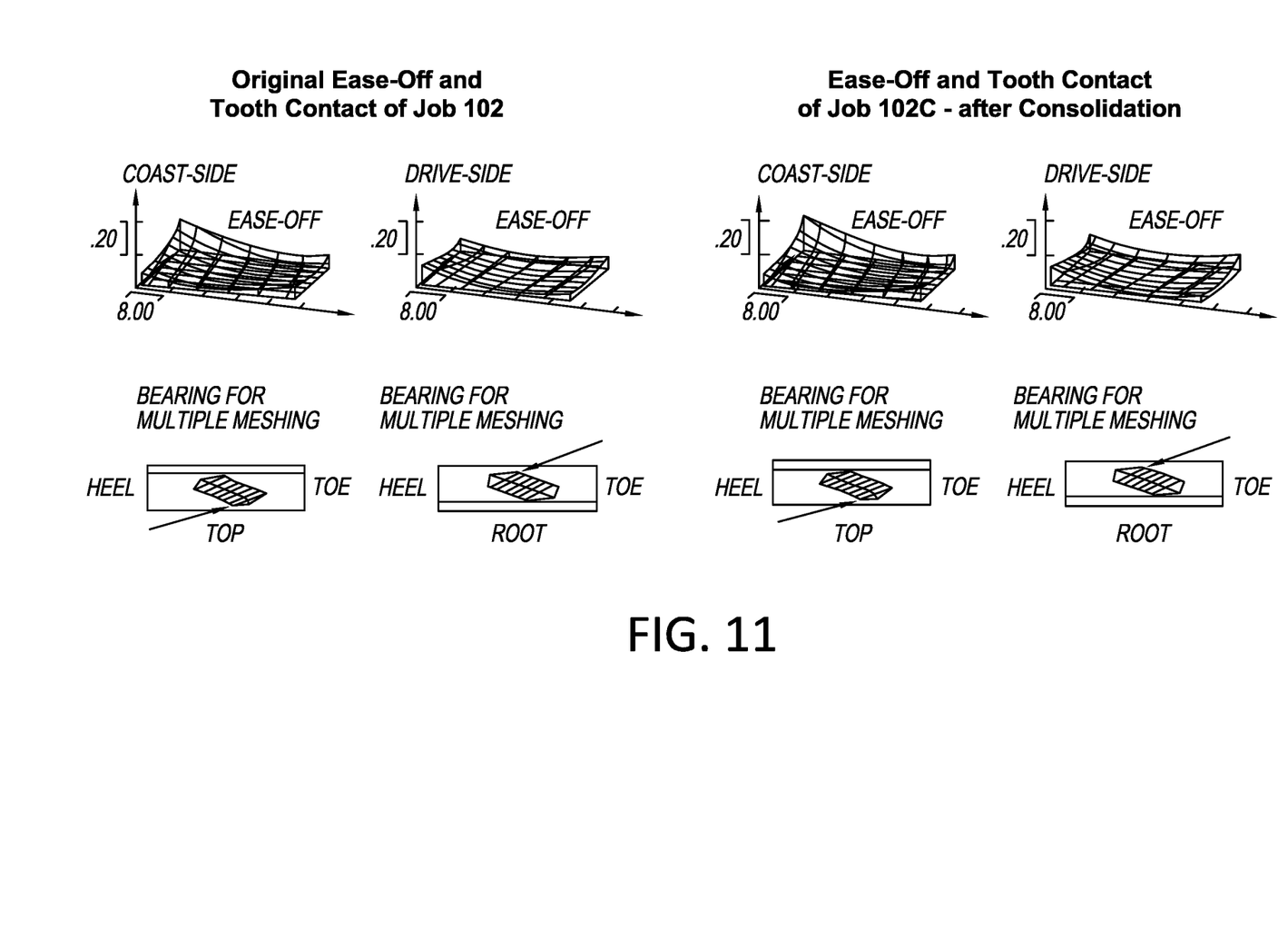
FIG. 11 shows the Ease-Off and tooth contact pattern before cutter consolidation and an Ease-Off and tooth contact pattern after cutter consolidation.

FIG. 11 shows the Ease-Off and tooth contact pattern before cutter consolidation next to the Ease-Off and tooth contact pattern after cutter consolidation. The left and right sequences of Ease-Offs and contact pattern appear to be nearly identical to the human eye. The arrows point at very small and negligible differences in the tooth contact pattern.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A method of manufacturing a gear cutting tool for cutting bevel and hypoid gears comprising one or more cutting blades with said cutting blades being configured whereby said gear cutting tool is operable for machining a plurality of gear design jobs for producing gears having different tooth geometries, said method comprising:
    defining a temporary master cutter wherein said temporary master cutter is defined by one of the jobs that cuts the smallest root slot width of all of said plurality of gear design jobs,
    defining a virtual master cutter representing a consolidation of the requirements of the jobs in said plurality of gear design jobs,
    providing data representative of each of said plurality of gear design jobs, said data being dependent upon said virtual master cutter,
    machining said one or more cutting blades of said gear cutting tool based on said data whereby said cutting tool is capable of producing said plurality of gear design jobs,
    said machined one or more cutting blades having a different blade geometry than cutting blades of specific individual cutting tools that would be necessary to separately cut each respective member of said plurality of gear design jobs.

2. The method of claim 1 wherein said plurality of gear design jobs are pinions.

3. The method of claim 1 wherein said plurality of gear design jobs are ring gears.

4. The method of claim 1 wherein a temporary master cutter for a pinion is different than a temporary master cutter for a ring gear.

5. The method of claim 1 wherein said virtual master cutter comprises parameters different than specific individual cutting tools that would be necessary to separately cut each respective member of said plurality of gear design jobs.

* * * * *